United States Patent [19]

Koli

[11] Patent Number: 5,098,777
[45] Date of Patent: Mar. 24, 1992

[54] COMPRESSED NON-ASBESTOS SHEET CONTAINING NOVALOID AND ARAMID FIBERS

[75] Inventor: Vasant M. Koli, Belleville, Canada

[73] Assignee: Durable Canada Ltd., Belleville, Canada

[21] Appl. No.: 592,446

[22] Filed: Oct. 1, 1990

[51] Int. Cl.⁵ .................. B32B 5/16; B32B 5/06; B32B 27/04; C08L 9/00
[52] U.S. Cl. .................. 428/283; 428/284; 428/286; 428/297; 428/298; 428/477.4; 428/902; 428/903; 524/2; 524/5; 525/233; 525/234
[58] Field of Search .......... 525/233, 234; 524/5, 524/2; 428/902, 113, 286, 283, 446, 408, 477.4, 284, 297, 298, 903

[56] References Cited

U.S. PATENT DOCUMENTS

| | | | |
|---|---|---|---|
| 4,156,533 | 5/1979 | Close | 227/229 |
| 4,223,897 | 9/1980 | Staab | 277/235 B |
| 4,271,288 | 3/1981 | Foster | 428/281 |
| 4,317,575 | 3/1982 | Cavicchio | 277/227 |
| 4,508,777 | 4/1985 | Yamamoto | 428/280 |
| 4,529,662 | 7/1985 | Lancaster | 428/450 |
| 4,529,663 | 7/1985 | Lancaster | 428/450 |
| 4,546,033 | 8/1985 | Tsuchimoto | 428/290 |
| 4,656,085 | 4/1987 | Bechen | 428/290 |
| 4,837,281 | 6/1989 | Hibbard et al. | 525/233 |
| 4,851,279 | 7/1989 | Das | 428/224 |
| 4,859,526 | 8/1989 | Potepan | 428/283 |

*Primary Examiner*—Jenna L. Davis
*Assistant Examiner*—James D. Withers
*Attorney, Agent, or Firm*—Roylance, Abrams, Berdo & Goodman

[57] ABSTRACT

A compressed non-asbestos sheet is formed with a body between starter and finish layers. The body has novaloid and aramid fibers in an amount more than 5% and less than 25% by weight of the total sheet. The body also includes elastomeric binders, fillers and rubber processing chemicals. The starter and finish layers include aramid fibers, elastomeric binders with a release agent, fillers and rubber processing chemicals.

24 Claims, No Drawings

COMPRESSED NON-ASBESTOS SHEET CONTAINING NOVALOID AND ARAMID FIBERS

FIELD OF THE INVENTION

This invention relates to a compressed non-asbestos sheet designed for use as gasket material and containing novaloid and aramid fibers. The gasket material can form gaskets for the pulp and paper industry, petrochemical refineries and production of automobile and other equipment.

BACKGROUND OF THE INVENTION

Compressed asbestos fiber sheets have been used as gasket material for many years in a variety of industries. Compressed asbestos sheets are prepared by mixing asbestos fibers with a rubber binder to form a dough mixture and pressing the dough mixture under pressure into a uniform product. Typically the sheet is formed on a rubber sheeter or two roll calender, which has one large heated roll and one smaller unheated or cooled roll. The dough mixture is built up on the heated roll while pressing against the cold roll. Laminating occurs as the roll revolves and while the sheet vulcanizes.

Health concerns relating to asbestos have made it desirable to switch to other materials for compressed gasket sheets.

U.S. Pat. No. 4,508,777 to Yamamoto et al discloses a compressed non-asbestos sheet with a high fiber content containing two types of fibers selected from the group consisting of inorganic fibers, other than asbestos or organic fibers.

U.S. Pat. No. 4,859,526 to Potepan et al discloses a high temperature compressed gasket sheet formed from carbon fibers having a carbon content above 90% and, optionally, organic fibers.

A compressed non-asbestos sheet that includes novaloid and aramid fibers, particularly Kynol and Kevlar fibers has not been previously known. U.S. Pat. No. 4,271,228 to Foster et al discloses that novaloid fibers and Kevlar fibers can be used in a fibrous sheet (col. 3, lines 19-48) generally known as a "beater sheet". U.S. Pat. No. 4,851,279 to Das et al mentions that Kynol fibers have been used in gaskets (col. 2, line 24).

Because of the variety of service applications and operating conditions requiring gasketing, there is a need for a compressed non-asbestos sheet that is versatile and can withstand a wide range of fluids at varying temperatures and pressures. In particular, there is a need for a compressed non-asbestos sheet that can withstand demanding operating conditions such as high temperatures and exposure to steam or severe chemicals. Further, there is a need for a compressed non-asbestos sheet that has excellent sealability, flexibility and cutting characteristics.

SUMMARY OF THE INVENTION

Accordingly, a primary object of this invention is to provide a compressed non-asbestos sheet that can withstand a wide range of fluids at varying temperatures and pressures. A further object is to provide a compressed non-asbestos sheet that can withstand demanding operating conditions such as high temperatures and exposure to steam or severe chemicals. A further object is to provide a compressed non-asbestos sheet that has excellent sealability, flexibility and cutting characteristics.

The foregoing objects are basically attained by providing a compressed non-asbestos sheet having starter and finish layers and a body between the starter and finish layers. The starter and finish layers each include aramid fibers, an elastomeric binder, inorganic filler and rubber processing chemicals. The body includes novaloid fibers, an elastomeric binder, inorganic filler and rubber processing chemicals. The total amount of fibers in the body and starter and finish layers is more than about 5% and less than 25% by weight of the total sheet. The elastomeric binder, inorganic filler and rubber processing chemicals included in the starter and finish layers may be the same or different from the elastomeric binder, inorganic filler and rubber processing chemicals included in the body layer.

Other objects, advantages and salient features of the invention will become apparent from the following detailed description, which discloses the preferred embodiments of the invention.

DETAILED DESCRIPTION OF THE INVENTION

The compressed non-asbestos sheet of the present invention includes a starter layer, a body, and a finish layer. The sheet is formed on a rubber sheeter or a 2-roll calender in a manner similar to previously known compressed asbestos or non-asbestos sheets. Typical processes involving the uses of rubber sheeters to form compressed non-asbestos sheets are disclosed in U.S. Pat. Nos. 4,508,777 and 4,859,526, the entire disclosures of which are incorporated by reference.

In the formation of the sheet, two different rubber binder dough mixes are used, a face dough composition to form the starter and finish layers and a body dough composition to form the body. The face dough composition is used to start the formation of the sheet on the rubber sheeter. Consequently, it must have the ability to adhere to the hot roll of the sheeter, avoid slipping during the formation of the sheet and release clearly once the process is finished. The face dough composition contains colors for identification and compounds providing antistick properties for gasket release after use. The face dough composition includes aramid fibers, elastomeric binders with a release agent, rubber processing chemicals, and inorganic fillers mixed with a solvent.

The body dough composition provides the main physical characteristics of the gasket, including the ability to resist heat, pressure and adverse chemicals and to prevent leakage. The body dough composition must have the ability to adhere to the starter layer in the formation of the sheet and to allow build-up in a homogenous manner to the desired uniform thickness across the total sheet. The body dough composition includes novaloid fibers, elastomeric binders, inorganic filler, and rubber processing chemicals mixed with a solvent and may also include aramid fibers.

The particular fibers used in the sheet are those that have been found to impart the desired physical characteristics including chemical steam and temperature resistance and improved versatility, sealability, flexibility and cutting characteristics.

The fibers chosen for the present invention are novaloid fibers such as are sold under the trademark "KYNOL" and fibrillatable organic fibers such as those aramid fibers sold by DuPont de Nemours, E.I. & Co., Inc. under the trademark "Kevlar". The amount of fiber in the sheet may vary from about 5% to less than 25% by weight of the total sheet, with about 5% to about 20% being Kynol fiber and from more than 0% to less than 15% being Kevlar fiber.

The diameter of a single fiber should be as small as possible, preferably on the order of 0.01 to 200 microns. The fibers having a larger diameter are undesirable since difficulties are encountered in the interlocking thereof due to their increased rigidity, thus resulting in a lowering of the strength of the end product. The fibers are preferably made of commercially available fibers having a diameter of about 5 to 50 microns.

The length of a single fiber is on the order of 1 to 30 mm but is preferably 1 to 10 mm. Fibers having a shorter length have a tendency to decrease the strength of the final products since they interlock only to a slight degree. There is also a tendency toward a lowering of the strength and sealing properties of the product when fibers of a longer length are used. This is because the fibers form with rubber, rubber chemicals and fillers, mixture in which they are insufficiently dispersed.

The most preferable fibers for the body are Kevlar fibers having an average length of about 2 mm to 5 mm and an average fineness of about 1.5 denier, Kynol fibers having an average length of about 3 mm to 6 mm and an average fineness of about 2.0 denier. A denier is a unit of fiber fineness used in the textile industry expressing the weight in grams of 9000 meters of fiber.

Preferably the Kynol fibers in the body make up from 5% to 20% by weight of the total sheet. The Kevlar fibers in the body, starter and finish layers combined preferably make up from 0% to 15% of the total sheet.

The binder serves to hold all the ingredients including fillers and fibers in a homogenous uniform manner. The choice of rubber type is determined by the use to which the gaskets are intended and the fluid to be confined by the gasket.

The binder used can be any common rubber or elastomer. The ones preferably used are styrene-butadiene (SBR), arcrylonitrile butadiene (NBR), chloroprene (CR), ethylenepropylenediene (EPDM) and the like. Blends of two or more can be used. The usual additive or compounding ingredients common in rubber processing are used. The binder amount can vary from 10% to 30% but it is preferable to have 15% to 25% of the total weight of the sheet.

The filler is preferably inorganic such as barium sulfate, barytes, clay, calcium, calcium carbonate, calcium metasilicate, calcium silicate, carbon, glass, kaolin, calcined kaolin, mica, molybdenum disulfide, amorphous silica, talc, feldspar, fly ash, cab-o-sil, diatomacerous earth, hedmanite, microsil, and the like, used along or in various mixtures thereof. The amount of fillers in the sheet is from about 50% to about 70% by weight.

In the processing of rubber binder with fillers and fibers, rubber processing chemicals including activators, vulcanizers, accelerators, antioxidants and colorants are generally required. Activators such as zinc oxide, litharge (lead oxide), lead carbonate, magnesium oxide, steric acid, urea, triethanolamine, and those listed in Rubber World, Blue Book published by Bill Communications, New York, may be used in the composition for the body and for the starter and finish layers. Suitable vulcanizers include, for example, sulfur, peroxides, magnesium oxide, and some sulfur bearing compounds.

Any suitable accelerator known to those in the art can be used. Thus, for example, one can use such accelerators as 2-mercaptobenzothiazole, benzothiazyl disulfide, tetraethyl thiuramdisulfide, and others listed in the above mentioned Blue Book.

These compounding agents and additives can be from 0.1% to 3% of the sheet by weight, however it is preferable to have 0.5% to 2% of the sheet by weight.

The compressed non-asbestos sheet of the present invention is preferably formed by separately mixing a face dough composition that is used to make the starter and finish layers and a body dough composition that is used to make the body. Mixing may be carried out with currently available mixers such as ribbon mixers, high intensity mixers, kneaders, planetary mixers or the like. Thorough mixing of the fibers with other materials is necessary because insufficient mixing results in incomplete dispersion of the fibers, which can lead to a lowering of the strength and sealing properties of the sheet.

The face and body dough compositions are formed by first forming their body cements separately. The elastomeric binder is soaked in a solvent, thereafter the solvent is drained, and then the elastomeric binder is mixed with the inorganic filler and rubber processing chemicals, with the addition of more solvent. The fibers are then fluffed in a mixer. More organic fillers may be added. The fibers are then mixed with the respective cements to form the face and body dough compositions.

The following example illustrates a preferred body composition in accordance with the invention.

EXAMPLE

| Body Cement | |
|---|---|
| toluene | 21 gal. |
| body rubber | 56 lbs. |
| barytes | 25 lbs. |
| rubber processing chemicals | 2 lbs. |
| Body Dough Composition | |
| Kevlar | 4 lbs. |
| Kynol | 6 lbs. |
| fillers | 30 lbs. |
| body cement | 70–80 lbs. |

The compressed non-asbestos sheet is formed from the face and body dough compositions by using a rubber sheeter or 2-roll calender as is generally known in the art. A rubber sheeter consists of one large steam heated roll and a smaller water cooled roll. The rolls are located vertical or horizontal to each other. Each roller revolves toward the other, forcing the dough mixture into the nip. The formation of a compressed sheet is initiated by coating the heated roll with enough of the face dough composition to completely cover the roll and form the starter layer. This is done with the rolls closed and rotating. The body dough composition is then fed into the nip between the rolls and adheres to the starter layer where it builds up with evaporation of the solvent until the desired thickness for the body is reached. The cold roll keeps pressure applied to the material building up at all times. As the material builds up, the roll slowly backs off but always maintains an applied pressure to ensure uniformity in manufacture. When the body builds to the desired thickness, the material is coated with the face dough composition to form the finish layer. The sheeter is then stopped and the compressed sheet is then cut and stripped off of the heated roll.

While only one embodiment has been chosen to illustrate the invention, it will be understood by those skilled in the art that various changes and modifications can be made therein without departing from the scope of the invention as defined in the appended claims.

What is claimed is:

1. A compressed non-asbestos sheet, comprising
starter and finish layers each including aramid fibers, an elastomeric binder, inorganic filler, and rubber processing chemicals; and
a body formed between said starter and finish layers, said body including novaloid fibers, an elastomeric binder, inorganic filler and rubber processing chemicals;
the total amount of fibers in said body, said starter layer and said finish layer being more than 5% and less than 25% by weight of the total sheet; and
the elastomeric binder, inorganic filler and rubber processing chemicals included in said starter and finish layers being the same as the elastomeric binder, inorganic filler and rubber processing chemicals included in said body.

2. The compressed non-asbestos sheet of claim 1, wherein
said body further includes aramid fibers.

3. The compressed non-asbestos sheet of claim 2, wherein
the amount of said novaloid fibers is from about 5% to about 20% by weight of the total sheet.

4. The compressed non-asbestos sheet of claim 2, wherein
the total amount of aramid fibers in said body and said starter and finish layers combined is from more than 0% to less than about 15% by weight of the total sheet.

5. The compressed non-asbestos sheet of claim 2, wherein
the total amount of elastomeric binders in said body and said starter and finish layers is from about 10% to about 30% by weight of the total sheet.

6. The compressed non-asbestos sheet of claim 1, wherein
the total amount of inorganic fillers in said body and said starter and finish layers is from about 50% to about 70% by weight of the total sheet.

7. The compressed non-asbestos sheet of claim 1, wherein
the total amount of rubber processing chemicals in said body and said starter and finish layers is from about 0.5% to about 2% by weight of the total sheet.

8. The compressed non-asbestos sheet of claim 2, wherein
the total amount of novaloid fibers is from about 5% to about 20% by weight of the total sheet, the total amount of aramid fibers is from more than 0% to less than 15% by weight of the total sheet, the total amount of elastomeric binders is from about 15% to about 25% by weight of the total sheet, the total amount of inorganic fillers is from about 50% to about 70% by weight of the total sheet and the total amount of processing chemicals is from about 0.5% to about 2% by weight of the total sheet.

9. The compressed non-asbestos sheet of claim 2, wherein
said novaloid fibers and said aramid fibers of said body and said aramid fibers of said starter and finish layers have an average diameter of between about 0.01 and about 200 microns and an average length of between about 1 and about 30 millimeters.

10. The compressed non-asbestos sheet of claim 2, wherein
said novaloid fibers and said aramid fibers of said body and said aramid fibers of said starter and finish layers have an average diameter of about 5 to about 50 microns and an average length of about 1 to about 10 millimeters.

11. The compressed non-asbestos sheet of claim 1, wherein
said aramid fibers of said starter and said finish layers have an average length of about 2 mm and an average fineness of about 1.5 denier.

12. The compressed non-asbestos sheet of claim 1, wherein
the elastomeric binder of said body and said starter and finish layers are selected from the group consisting of nitrile rubber, styrene-butadiene rubber, chloroprene rubber, ethylenepropylenediene rubber and any blend thereof.

13. A compressed non-asbestos sheet, comprising
starter and finish layers each including aramid fibers, an elastomeric binder, inorganic filler, and rubber processing chemicals; and
a body formed between said starter and finish layers, said body including novaloid fibers, an elastomeric binder, inorganic filler and rubber processing chemicals;
the total amount of fibers in said body, said starter layer and said finish layer being more than 5% and less than 25% by weight of the total sheet; and
the elastomeric binder, inorganic filler and rubber processing chemicals included in said starter and finish layers being different from the elastomeric binder, inorganic filler and rubber processing chemicals included in said body.

14. The compressed non-asbestos sheet of claim 13, wherein
said body further includes aramid fibers.

15. The compressed non-asbestos sheet of claim 14, wherein
the amount of said novaloid fibers is from about 5% to about 20% by weight of the total sheet.

16. The compressed non-asbestos sheet of claim 14, wherein
the total amount of aramid fibers in said body and said starter and finish layers combined is from more than 0% to less than about 15% by weight of the total sheet.

17. The compressed non-asbestos sheet of claim 14, wherein
the total amount of elastomeric binders in said body and said starter and finish layers is from about 10% to about 30% by weight of the total sheet.

18. The compressed non-asbestos sheet of claim 13, wherein
the total amount of inorganic fillers in said body and said starter and finish layers is from about 50% to about 70% by weight of the total sheet.

19. The compressed non-asbestos sheet of claim 13, wherein
the total amount of rubber processing chemicals in said body and said starter and finish layers is from about 0.5% to about 2% by weight of the total sheet.

20. The compressed non-asbestos sheet of claim 14, wherein
the total amount of novaloid fibers is from about 5% to about 20% by weight of the total sheet, the total amount of aramid fibers is from more than 0% to less than 15% by weight of the total sheet, the total amount of elastomeric binders is from about 15% to about 25% by weight of the total sheet, the total amount of inorganic fillers is from about 50% to about 70% by weight of the total sheet and the total amount of processing chemicals is from about 0.5% to about 2% by weight of the total sheet.

21. The compressed non-asbestos sheet of claim 14, wherein
said novaloid fibers and said aramid fibers of said body and said aramid fibers of said starter and finish layers have an average diameter of between about 0.01 and about 200 microns and an average length of between about 1 and about 30 millimeters.

22. The compressed non-asbestos sheet of claim 14, wherein
said novaloid fibers and said aramid fibers of said body and said aramid fibers of said starter and finish layers have an average diameter of about 5 to about 50 microns and an average length of about 1 to about 10 millimeters.

23. The compressed non-asbestos sheet of claim 13, wherein
said aramid fibers of said starter and said finish layers have an average length of about 2 mm and an average fineness of about 1.5 denier.

24. The compressed non-asbestos sheet of claim 13, wherein
the elastomeric binder of said body is selected from the group consisting of nitrile rubber, styrene-butadiene rubber, chloroprene rubber, ethylene-propylenediene rubber and any blend thereof.

* * * * *

UNITED STATES PATENT AND TRADEMARK OFFICE
CERTIFICATE OF CORRECTION

PATENT NO. : 5,098,777
DATED : March 24, 1992
INVENTOR(S) : Vasant M. Koli

It is certified that error appears in the above-indentified patent and that said Letters Patent is hereby corrected as shown below:

On the title page, in the left column,
"[73] Assignee: Durable Canada Ltd.,
Belleville, Canada"

should read

--[73] Assignee: Durable Canada Ltd.,
Belleville, Canada--.

Signed and Sealed this

Twenty-fourth Day of August, 1993

Attest:

BRUCE LEHMAN

*Attesting Officer*        *Commissioner of Patents and Trademarks*

UNITED STATES PATENT AND TRADEMARK OFFICE
CERTIFICATE OF CORRECTION

PATENT NO. : 5,098,777
DATED : March 24, 1992
INVENTOR(S) : Vasant M. Koli

It is certified that error appears in the above-identified patent and that said Letters Patent is hereby corrected as shown below:

On the title page, in the left column,

"[73] Assignee: Durable Canada Ltd.,
Belleville, Canada"

should read

--[73] Assignee: Durabla Canada Ltd.,
Belleville, Canada--.

This certificate supersedes certificate of correction issued Aug. 24, 1993.

Signed and Sealed this

Second Day of November, 1993

Attest:

BRUCE LEHMAN

*Attesting Officer*     *Commissioner of Patents and Trademarks*